F. BEX.
APPARATUS FOR SETTING METAL-AXLES.
No. 6,997. Reissued March 14, 1876.
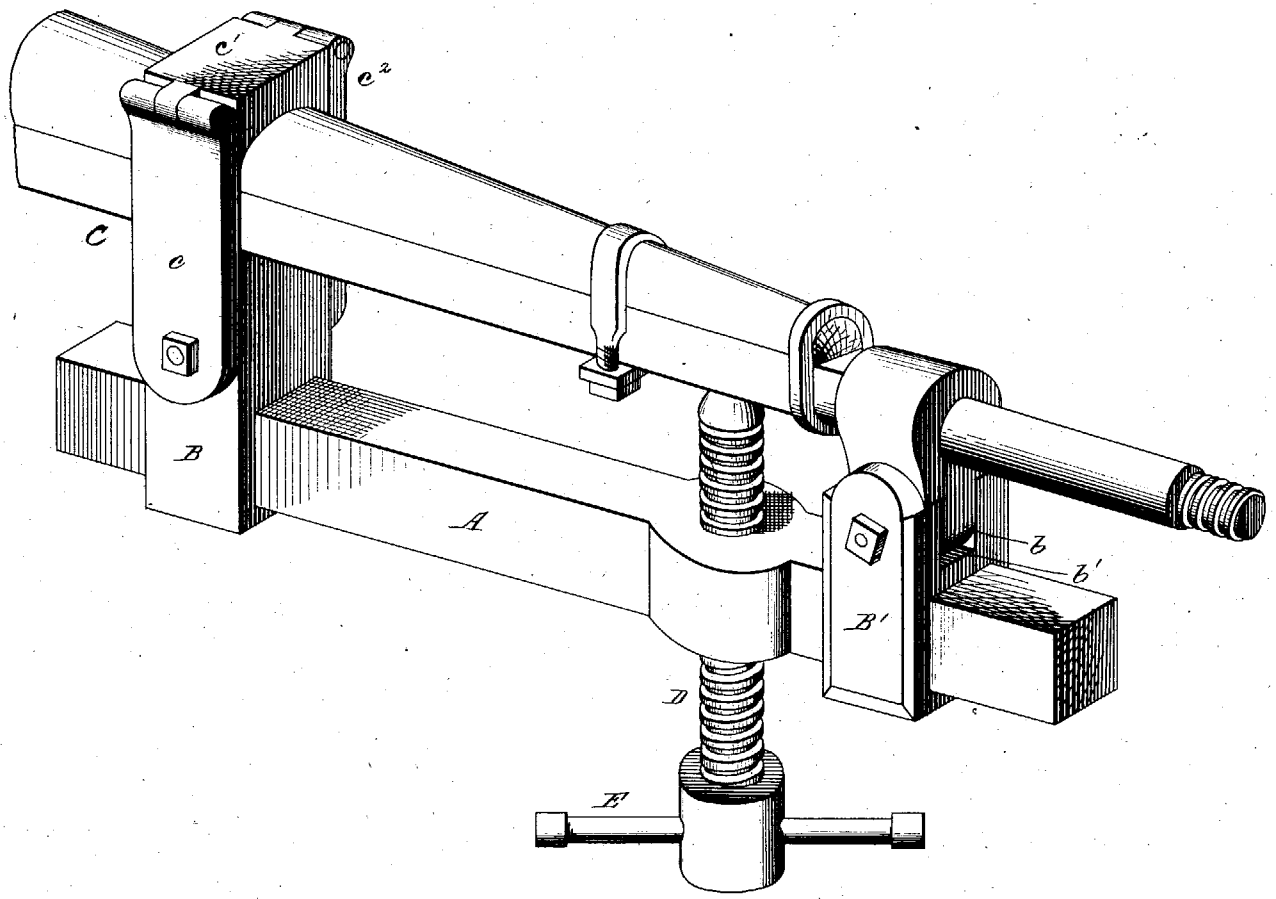
WITNESSES
Geo. H. Graham.
J. L. Coombs
INVENTOR
Frederick Bex
By A. H. Norris,
Attorney

UNITED STATES PATENT OFFICE.

FREDERICK BEX, OF WASHINGTON, DISTRICT OF COLUMBIA.

IMPROVEMENT IN APPARATUS FOR SETTING METAL AXLES.

Specification forming part of Letters Patent No. 171,343, dated December 21, 1875; reissue No. 6,997, dated March 14, 1876; application filed March 6, 1876.

*To all whom it may concern:*

Be it known that I, FREDERICK BEX, of Washington, in the District of Columbia, have invented certain new and useful Improvements in Apparatus for Setting Metal Axles, of which the following is a specification:

The object of this invention is to produce an apparatus by means of which the axles of wagons, carriages, and other similar vehicles can be straightened or set, should they happen to become bent out of shape, without removing them from the body of the vehicle, as has hitherto been necessary.

My invention consists of a bar of iron, steel, or other suitable material, of rectangular, polygonal, or cylindrical shape, provided with a movable head at one end, to which is secured a hinged yoke, consisting of three hinged parts, adapted to be secured over the wagon-axle, between its points of union with the body, the other end of said bar being provided with a sliding head, the upper end of which is provided with an eye or aperture, in order that it may be set over the end of the axle, the bar being provided with a powerful screw between the two heads, the end of which can be brought to bear at any desired point upon the axle to straighten it.

The drawing represents a perspective view of my invention, in which the letter A represents the bar which supports the two heads, and B and B′ represent the heads. The head B is adapted to slide upon the bar A, and has attached to it a hinged yoke, C, consisting of three parts, $c$ $c^1$ $c^2$. The part $c$ is secured at its lower end to the head B, or is formed thereon during its construction. To the upper end of said part $c$ is hinged one end of the part $c^1$, the under side of which may be curved to conform to the shape of the upper side of the axle, if desired. To the other end of said part $c^1$ is hinged the part $c^2$, the lower end of which is provided with an aperture through which a screw-bolt may be inserted, in order to secure it to the head B. Other means of attachment, however, may be employed to accomplish this purpose.

The head B′ is adapted to slide upon the bar A, and is provided with an aperture or eye by which it can be fitted over the end of the axle of the vehicle.

The head B′ is formed in two parts, that portion of the said head in which the aperture or eye is formed being provided with a shank, $b$, which is pivoted in a slot in the lower portion $b'$ of said head, in order to adapt the head for the reception of the axle when bent considerably out of line. Between the two heads the bar is enlarged and provided with a screw-threaded aperture, which is fitted with a powerful screw, D, provided with a lever, E, at one end, by which it may be turned, and having its other end rounded off to form a proper bearing-surface against the axle while in operation.

The operation of my apparatus is as follows: The wheel is removed from the axle to be straightened, and the bar placed longitudinally beside said axle, in proper position to bring the end of the screw to bear in the required place. The heads are then adjusted and secured, the head B being passed under the body of the vehicle, and hinged yoke passed over the axle and fastened to the head, and the head B′ being simply passed up onto the end of the axle. The screw is then put into operation and made to bear upon the axle until it assumes its proper shape.

I am aware of the patent of David Ducharne, No. 82,929, dated October 13, 1868, and I disclaim the construction therein shown, for such is not my invention.

Having thus described my invention, what I claim, and desire to secure by Letters Patent, is—

1. The head B, arranged on the bar A and provided with the hinged yoke C, consisting of the three hinged parts $c$ $c^1$ $c^2$, in combination with the head B′, arranged on the bar A, and having an eye for the reception of the axle, and with the screw D passing through the said bar for bearing against the under side of the axle, while the hinged yoke and eyed head prevent vertical displacement, the whole being otherwise constructed, as set forth.

2. In combination with the bar A, provided with the screw D, the heads B and B′, the latter being formed in two parts, the upper part being provided with an eye or aperture for the reception of the axle, and pivoted to the lower portion, in order to adapt itself to the axle when bent, substantially as herein set forth.

In testimony whereof I have hereunto signed my name before two subscribing witnesses.

FREDERICK BEX.

Witnesses:
JOS. L. COOMBS,
A. H. NORRIS.